Oct. 17, 1939.                P. McJUNKIN                2,176,433
                            RECORDING APPARATUS
                    Original Filed Nov. 1, 1934    5 Sheets-Sheet 1

INVENTOR
PAUL McJUNKIN
BY R. J. Dearborn
HIS ATTORNEY

Oct. 17, 1939.  P. McJUNKIN  2,176,433
RECORDING APPARATUS
Original Filed Nov. 1, 1934   5 Sheets-Sheet 2

INVENTOR
PAUL McJUNKIN
BY R. J. Dearborn
HIS ATTORNEY

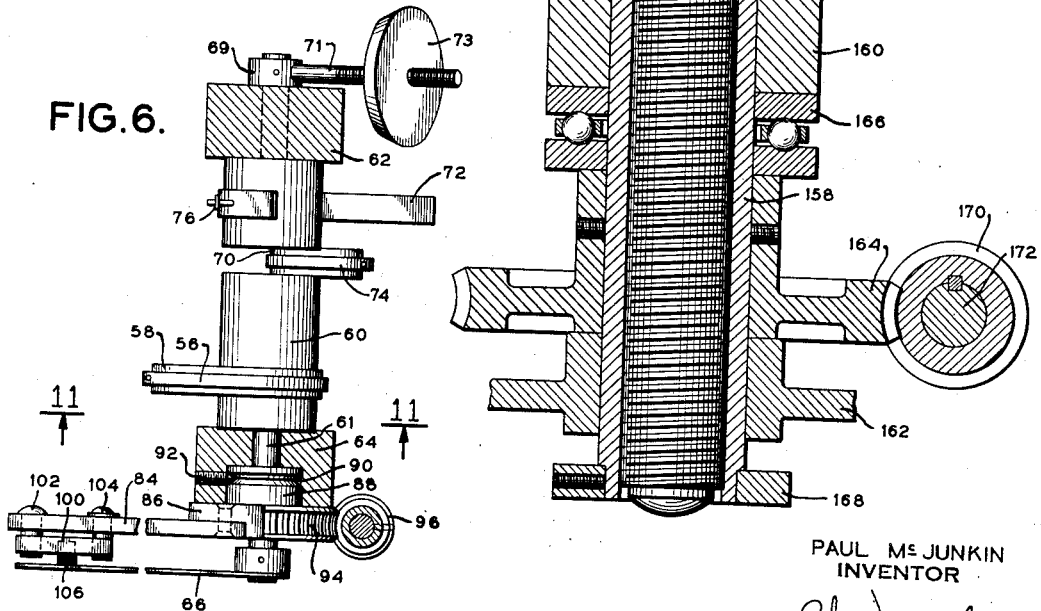

Oct. 17, 1939.  P. McJUNKIN  2,176,433
RECORDING APPARATUS
Original Filed Nov. 1, 1934   5 Sheets-Sheet 4
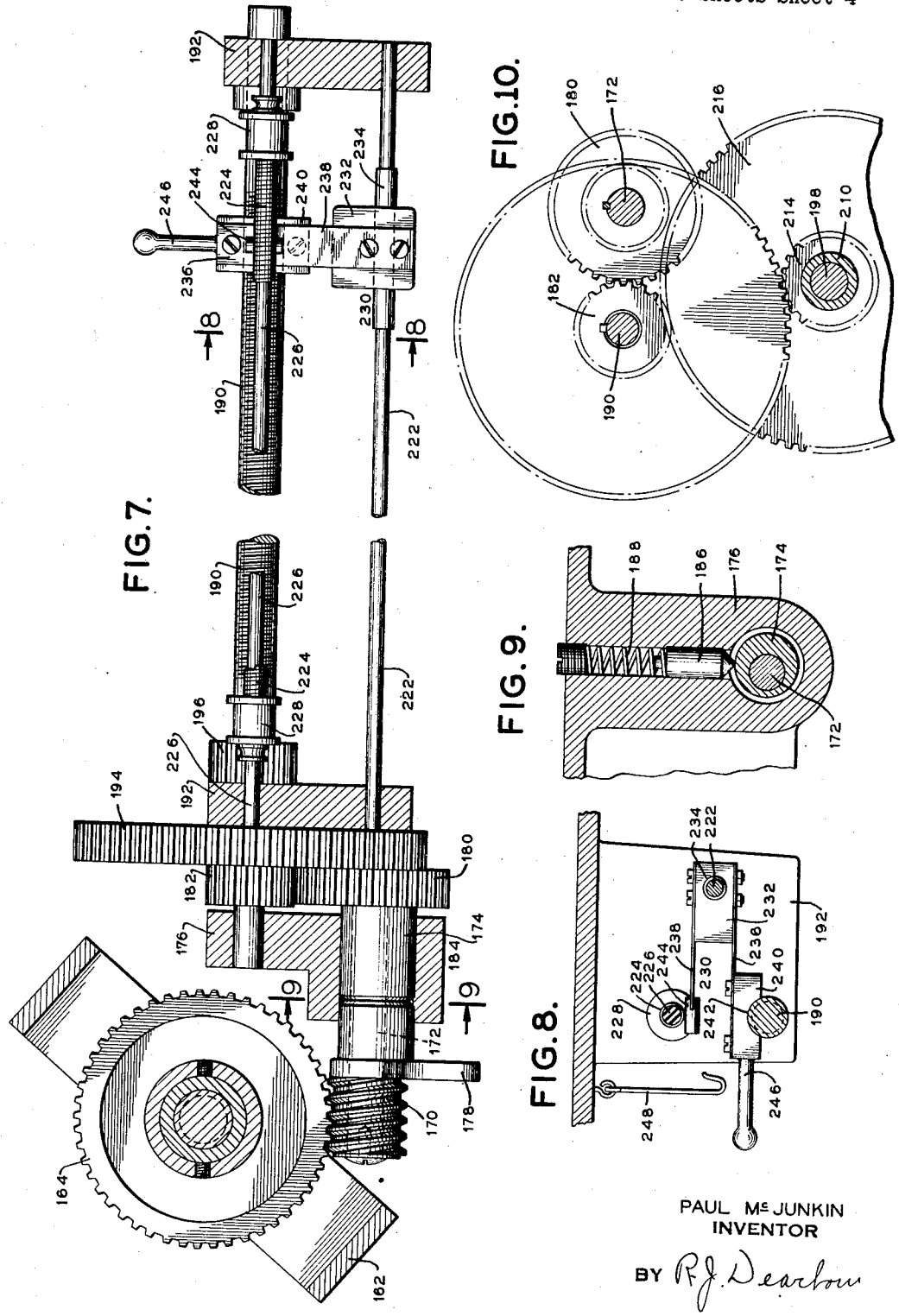
PAUL McJUNKIN
INVENTOR
BY R. J. Dearborn
HIS ATTORNEY Oct. 17, 1939.　　　　P. McJUNKIN　　　　2,176,433
RECORDING APPARATUS
Original Filed Nov. 1, 1934　　5 Sheets-Sheet 5

INVENTOR
PAUL McJUNKIN
BY *R. J. Dearborn*
HIS ATTORNEY

Patented Oct. 17, 1939

2,176,433

UNITED STATES PATENT OFFICE 2,176,433

RECORDING APPARATUS

Paul McJunkin, Wrightsville, Pa., assignor to The Texas Company, New York, N. Y., a corporation of Delaware Original application November 1, 1934, Serial No. 750,924. Divided and this application January 3, 1936, Serial No. 57,345

3 Claims. (Cl. 177—351)

This invention relates to recording apparatus and more particularly to apparatus for continuously indicating and intermittently recording the pressures exerted upon a plastic such as a grease by an object moving into or through the grease.

The principal object of the invention is to provide a machine or apparatus of this type which will be reasonably simple in operation and extremely sensitive and accurate in the results obtained.

This is a division of copending application Serial No. 750,924 filed November 1, 1934.

In carrying out the invention, a machine has been provided in which the grease sample contained in a small cup is mounted on a platform in a chamber, the temperature of which may be controlled so as either to be maintained at a predetermined fixed point or to be increased or decreased uniformly at a definite rate. A perforated plate or plunger is arranged in the chamber so that it may exert a predetermined pressure on the grease in the cup, the rate of entry of the perforated plate and hence the amount of grease fed being recorded or so that the perforated plate may be advanced at a uniform rate into and through the grease and the pressure required under changing conditions of temperature recorded. The platform is connected to a very accurate scale mechanism so that the pressure being exerted on the grease by the plunger may be measured continuously. In other words, the scale will measure the resistance to the entry of the plunger in the grease. Recording apparatus is provided for recording on uniformly moving charts the scale readings as well as the temperature readings in the grease chamber.

For a better understanding of my invention reference may be had to the accompanying drawings in which:

Figure 3a is a view of the perforated plunger plate taken on line 3a—3a of Figure 3.

Figure 4 is a vertical section of a portion of the driving mechanism on line 4—4 of Figure 1.

Figure 5 is a view partly in section of the resistance contacting mechanism taken on line 5—5 of Figure 1.

Figure 6 is a view partly in section of the cams in the pressure indicating mechanism taken on line 6—6 of Figure 1.

Figure 7 is a sectional plan view taken on line 7—7 of Figure 1.

Figure 8 is a sectional view of the potentiometer contacting mechanism taken on line 8—8 of Figure 7.

Figure 9 is a sectional view taken on line 9—9 of Figure 7.

Figure 10 is an elevation of part of the gearing in the driving mechanism taken on line 10—10 of Figure 1.

Figure 11 is a vertical sectional elevation of the cams in the pressure indicating mechanism taken on line 11—11 of Figure 6.

Figure 12:
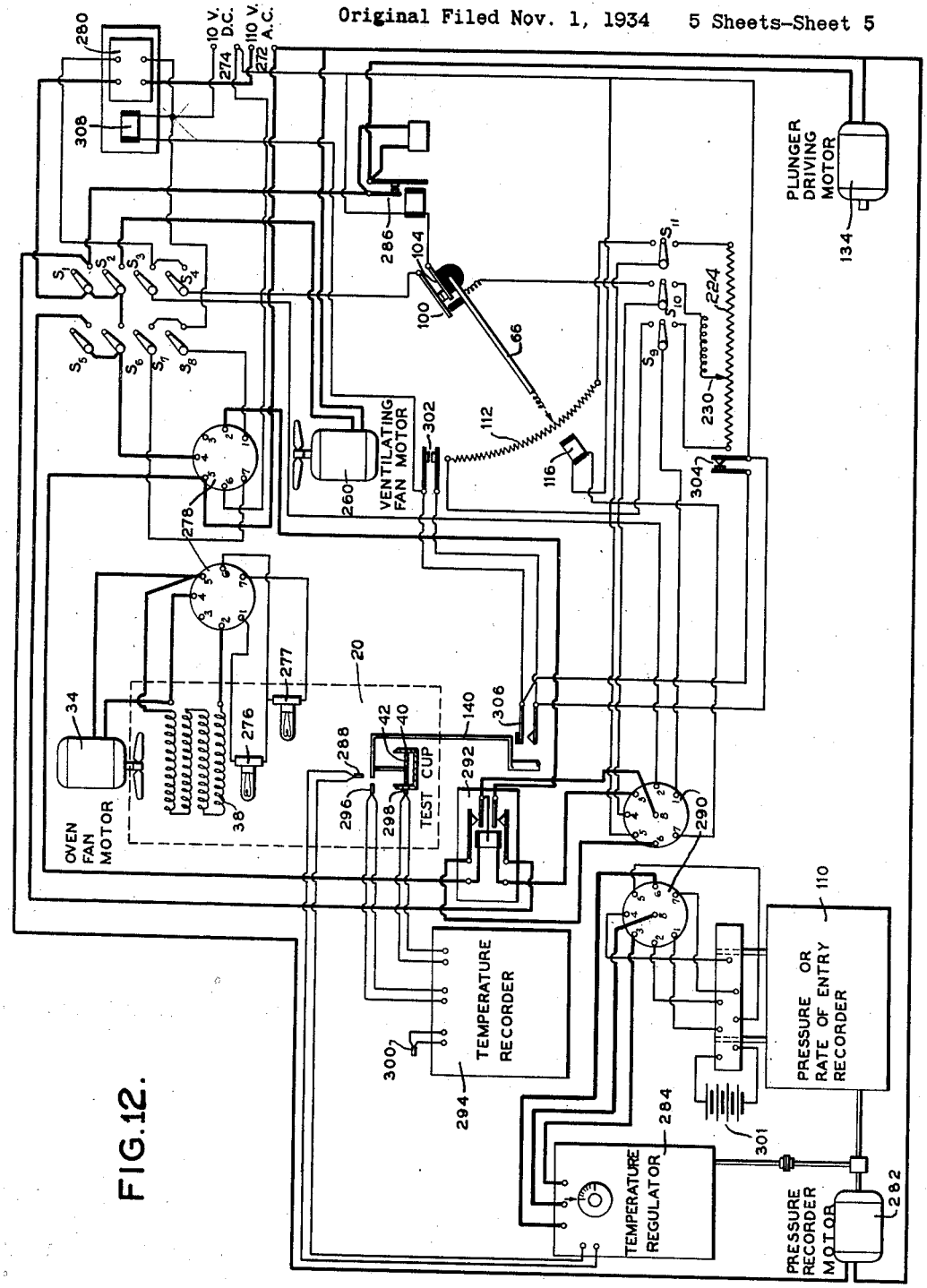

Figure 12 is a digaram of the electrical connections in which the 110 volt A. C. circuits are shown in heavy lines and the 10 volt D. C. circuits in light lines.

Figure 1:
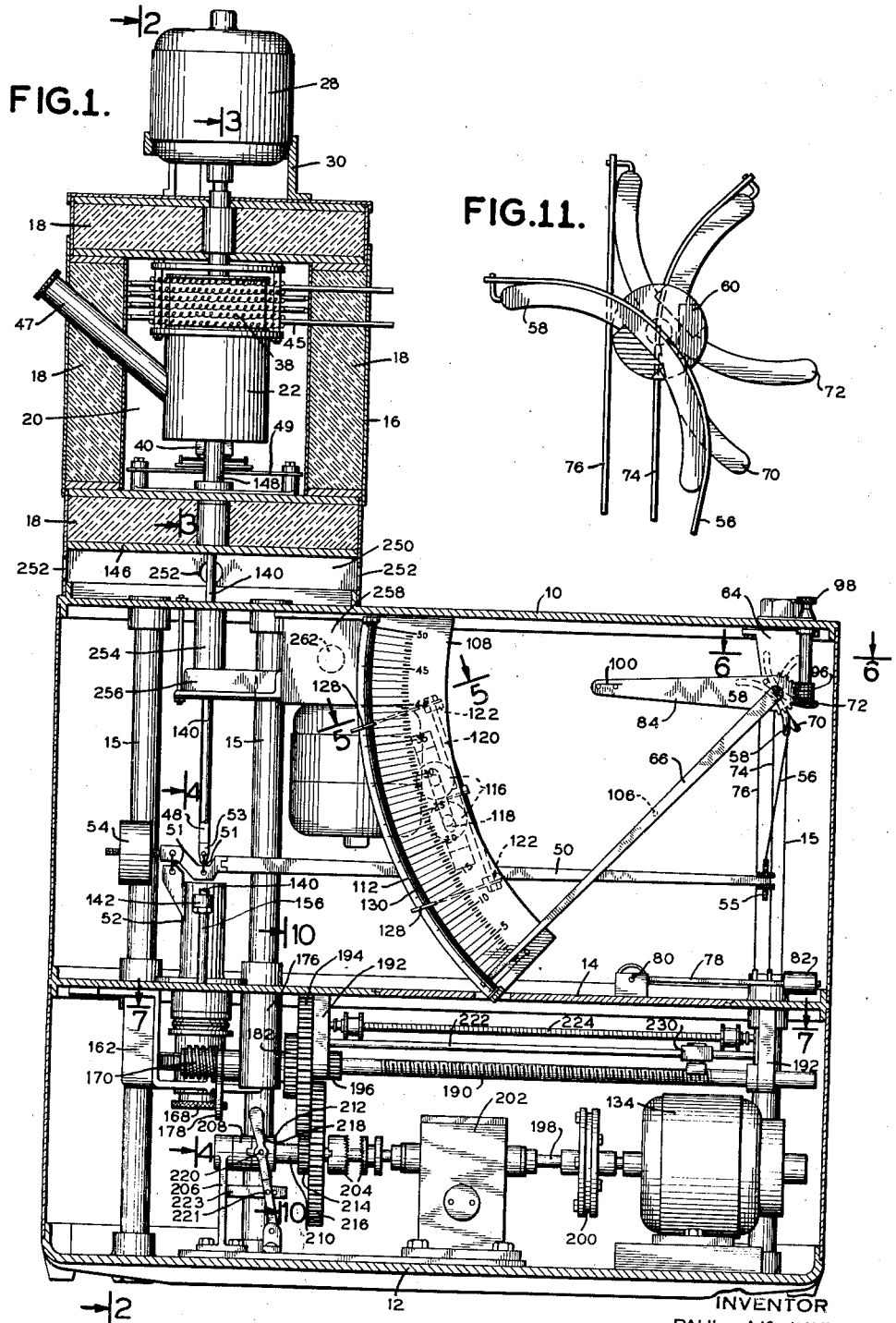
Figure 1 is a vertical elevation partly in section of the grease testing machine, taken on line 1—1 of Figure 2.

Referring to the drawings and particularly to Figure 1, the apparatus is shown as being enclosed for the most part in a casing 10 which may be of metal or some other suitable material and which is provided with a base 12 and a horizontal partition 14 which serves to divide the case into two parts. A plurality of vertical posts 15 serve to support the upper wall of the casing as well as the partition 14.

Heating chamber

Mounted on the top of the casing 10 is a smaller casing 16 the walls of which are preferably formed of sheet metal with the space between the metal sheets filled with a suitable heat insulating material 18. The heat resisting walls of the casing 16 provide a heating chamber or oven 20 and provisions are made for maintaining the temperature in this chamber at any predetermined degree or for increasing or decreasing the temperature uniformly as desired.

Figure 3:
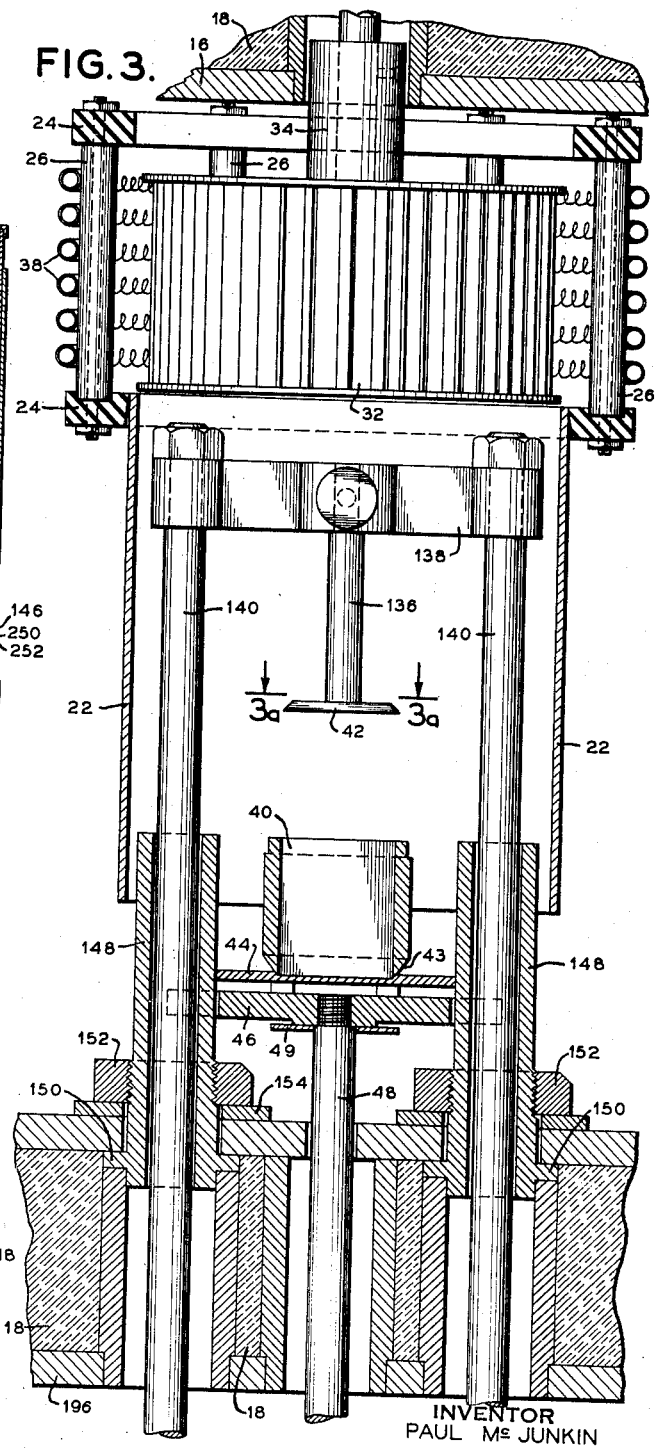
Figure 3 is a vertical section of the grease chamber on line 3—3 of Figure 1.

Supported within the chamber 20 is a cylindrical member 22 shown more clearly in Figure 3 of the drawings. The cylinder 22 is supported from the upper wall of the casing 16 by a pair of annular rings 24, these rings being connected by a plurality of heat resisting rods or posts 26. The upper ring 24 is suitably bolted to the upper wall of the casing 16 and the cylinder 22 is connected to and depends from the lower ring 24.

As is shown in Figure 1 an electric motor 28 is supported on the top of the casing 16 by means of suitable brackets 30. The shaft of the motor 28 extends downwardly through the upper wall of the casing 16 and at the lower end of the motor shaft is attached a fan 32 having a hub 34. An electrical resistance element 38 is wound in a spiral around the heat resisting posts 26 and this heating element comprises the means for maintaining the temperature within the chamber 20 either at a constant point or for varying the temperature at any predetermined rate.

Within the chamber 20 and partially surrounded and protected by the cylinder 22 are mounted the grease container or cup 40 and a perforated plate or plunger 42 which is adapted to enter and pass through the grease in the container as will be explained in detail hereinafter.

The grease container which is square in cross section is provided with a sharpened or beveled lower edge 43 and is supported upon a plate 44 mounted in turn upon another plate 46. Through the provision of the beveled lower edge 43 on the grease cup 40, it is possible to cut a block of grease directly from a sample without disturbing the conditions of the grease in any manner. The plate 46 is secured at its center to the upper end of a rod 48 which rod extends downwardly through the heat insulated lower wall of the casing 16 and the top of the casing 10.

Figure 2:
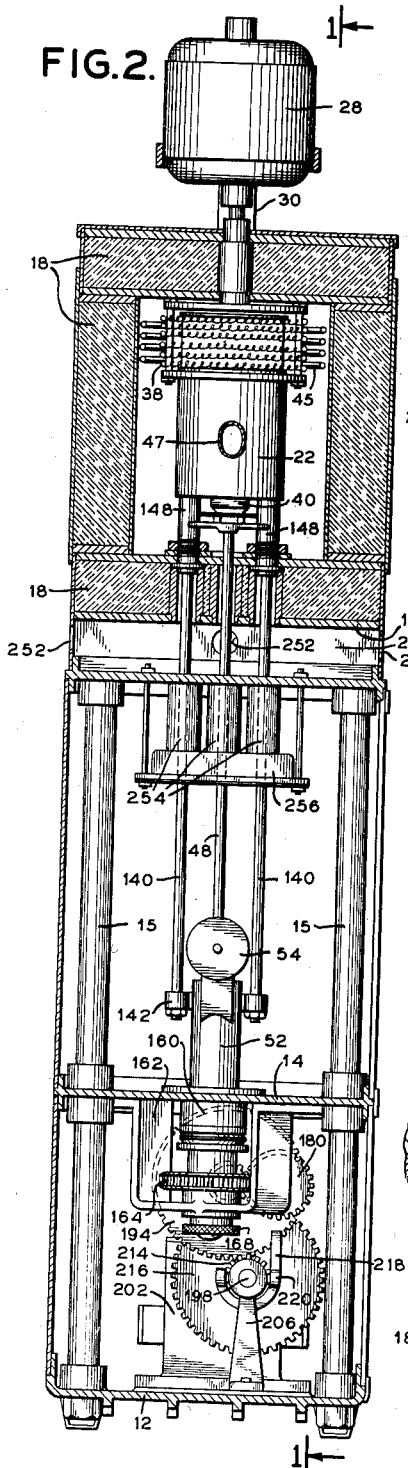
Figure 2 is an end elevation of the grease testing machine partly in section and taken on line 2—2 of Figure 1.

In case it is desired to reduce the temperature of the chamber 20 below room temperature, means are provided in the form of a coil of tubing 45 which may be cooled by circulating therethrough a refrigerating medium such as cold brine or cold carbon dioxide gas derived from liquid $CO_2$. As is shown in Figures 1 and 2 the coil 45 is mounted in the upper portion of the chamber 20 opposite the electrical heating element 38. The flow of the refrigerating medium may be controlled in any suitable way such as by thermostats, not shown, in a manner similar to the control of the electrical resistance heater 38, which control will be described hereinafter. Cold tests may thus be made on greases intended to be used on refrigerating machinery or for winter temperatures.

The rotation of the fan 32 will cause the air to be blown outwardly past the heating element 38 or the cooling coil 45, and this air after passing downwardly within the chamber 20 will pass around the grease cup 40 returning upwardly within the cylinder 22 to the fan 32. Through this arrangement the air within the chamber 20 will be kept constantly in circulation and the temperatures at all points within the chamber will be substantially the same and the temperature of the grease in the cup 40 will vary directly in accordance with the amount of heat emitted from the resistance element 38 or absorbed by the cooling coil 45.

As will be observed with reference to Figure 1, a tube 47 extending outwardly from the cylinder 22 to a point outside of the casing 16 and provided near its outer end with a glass window, not shown, serves to permit visual inspection of the grease in the cup 40 while a test is being conducted. In order to prevent any sidewise movement of the grease cup 40, a thin metallic strip or band 49 secured at its center to the upper end of the rod 48 is attached at its ends to a pair of posts secured to the lower wall of the chamber 20. Due to the flexibility of the strip 49 the upward and downward motion of the grease cup 40 will not be interfered with while at the same time any tendency of the cup to move sidewise will be prevented.

*Pressure indicating mechanism*

Arranged substantially horizontally within the casing 10 is a scale beam 50 which is pivotally supported by means of a spring clip 51 at one end on a bracket 52 mounted on the partition 14. The spring clip 51 consists of a short strip of spring metal having lugs attached to its ends, the lugs fitting in suitable openings in the scale beam 50 and the bracket 52. The lower end of the rod 48 is enlarged as at 53 and is also pivotally attached by means of a similar spring clip (shown in Figures 1 and 4) to the scale beam 50 at a point near the left hand end of the beam as viewed in Figure 1. A counterweight 54 is adjustably mounted by means of a threaded connection on the left hand end of the beam 50.

The outer or right hand end of the scale beam 50 is provided with an adjusting screw 55 and to the upper end of the screw 55 is attached a flexible strip 56 extending upwardly and around an arc-shaped cam 58 shown more clearly in Figures 6 and 11. The upper end of the strip 56 is secured to one end of the cam 58. The cam 58 is secured to a cam shaft 60 which shaft is mounted between and pivotally supported by brackets 62 and 64 which brackets are secured to the underside of the upper wall of the casing 10, as shown in Figure 1. At one end of the cam shaft 60 is secured a pointer 66 which cooperates with the scale 68 to be described in detail hereinafter. Affixed to one end of the cam shaft 60 is a collar 69 and secured to this collar is a threaded rod 71 projecting radially and in parallel alignment with the pointer 66. A suitable weight 73 is threaded on the rod 71, this weight serving as a counterbalance for the weight of the pointer 66. The weight 73 is adjustable longitudinally of the rod 71 and the collar 69 can be rotatably adjusted on the shaft 60 and locked by means of a suitable set screw. It can be seen, therefore, that through this arrangement the pointer 66 can be counterbalanced very accurately.

The cam shaft 60 has attached thereto two other arc-shaped cams 70 and 72 similar in contour to the cam 58, these cams being arranged substantially at 45° to each other. At the upper ends of the cams 70 and 72 are attached flexible strips 74 and 76 respectively. The strips 74 and 76 extend downwardly and each is secured to one of a pair of levers 78 pivotally mounted as at 80 on the partition 14. A weight 82 is threaded on the outer end of each lever 78 and can be adjusted toward or away from the pivot 80 to vary the tension in the strips 74 and 76. Only one of the levers 78 and one weight 82 are shown in Figure 1 of the drawings but it is to be understood that the other weight and lever are located directly in back of the one shown. It is necessary to have some slight tension on the strip 56 and this is accomplished by the action of the weight attached to the strip 76. In adjusting the machine the weight of the beam 50 is partly counterbalanced by the weight 82 attached to the strip 76 and partly by the counterweight 54. Therefore, that part of the weight of the beam 50 which is balanced by the weight 82 attached to the strip 76 must be compensated by applying the last mentioned weight to the cam 72 which is exactly similar to but 180° opposed to, cam 58. The function of the cam 70 and weight 82 acting through the strip 74 is to balance the pressure applied to the grease by the plate or plunger 42 and transmitted to the beam 50 through the rod 48 and link 51.

Through the use of the series of cams having the particular shape and arrangement shown in Figures 1 and 6, readings on the scale 68 may be obtained which will be very accurate on the small values at the lower end of the scale and at the same time accurate to the same degree on the larger values on the same scale. For instance, at the lower portion of the scale the pointer 66 may be moved two millimeters by a change in weight or pressure on the grease in the cup 42 of one gram while in the upper portion of the scale the same distance may correspond to a change in weight or pressure of one kilogram. It is thus possible to determine a pressure through a very wide range with approximately equal percentage of accuracy throughout the entire range. With the mechanism here described the first few grams could be read to $\tfrac{1}{10}$ gram or better than 1% accuracy while in the upper portion of the scale $\tfrac{1}{10}$ millimeter would represent perhaps 100 grams, again with 1% accuracy.

Forming part of the mechanism to be used when it is desired to maintain a predetermined constant pressure between the perforated plunger 42 and the grease in the cup 40, an adjustable stop or contact arm 84 is provided, this arm being secured to a disc 86 to which disc is also secured a hub 88. The bracket 64 has a cut-out portion in which the hub 88 is fitted, the bracket thus acting as a bearing for the hub and disc 86. The disc 86 and hub 88 are provided with a center opening through which the cam shaft 61 passes. The hub 88 is provided with a peripheral groove 90 which cooperates with a set screw 92 to prevent longitudinal movement of the hub. Disc 86 and hub 88 are thus co-axial with the cam shaft 61 and serve to pivotally support the arm 84. The disc 86 is provided at one side with a set of threads or teeth 94 adapted to cooperate with a worm 96 on a shaft depending from and journaled in the top wall of the casing 10. The shaft containing the worm 96 is provided at its upper end with a knurled adjusting button 98 and by turning this button in the proper direction the contact arm 84 may thus be moved either clockwise or counter-clockwise.

The outer end of the contact arm 84 is provided with a spring contact strip 100 secured at one end to a pin 102 on the arm 84 and normally resting against or contacting with a contact pin 104 also secured to but electrically insulated from the arm 84. A pin or projection 106 of electrically insulating material is secured to the pointer 66 in alignment with the strip 100. It will thus be seen that after the contact arm 84 has been adjusted to a predetermined position with the pin 106 holding the spring 100 away from the pin 104, if the pointer should tend to fall below the position of the arm 84, an electrical contact will be made between the spring 100 and the pin 104 to thus complete an electrical circuit to be described hereinafter. It is to be understood that the mechanism described in this paragraph is not used when a "constant rate of entry" test is being run; since in that test it is the variable pressure exerted between the plunger 42 and the grease in the cup 40 which is to be noted and recorded. When conducting the "constant rate of entry" test the arm 84 will be turned upwardly out of the range of the pointer 66.

Secured to the underside of the upper wall of the casing 10 is an arc-shaped scale supporting member 108 to which is affixed the scale 68. The scale is, of course, of a shape to correspond with the path of the outer end of the pointer 66 and may contain suitable indicia denoting the pressure exerted upon the grease in the cup or container 40.

In order that the pressure being exerted upon the grease in the container 40 may be recorded at predetermined intervals, an arrangement is provided whereby the exact position of the pointer 66 with relation to the scale 68 may be accurately indicated on the pressure recorder 110 shown in the wiring diagram of Figure 12. As is shown in Figures 1 and 5, an electrical potentiometer 112 of the same shape as the scale 68 is mounted a slight distance from the outer edge of the scale and secured at its extremity to the plate 108. This potentiometer is preferably formed of a winding of suitable resistance wire wound upon a core of insulating material. The outer end of the pointer 66 has attached thereto a contact member 114 adapted to be forced against and to make electrical contact with the potentiometer 112.

In order to force the pointer contact 114 against the potentiometer 112 at predetermined intervals, a pair of electro-magnets 116 and an armature 118 are suitably mounted on the back of the plate 108. The armature 118 is in the form of an arm rigidly secured at one end to a shaft 120 pivotally mounted in brackets 122 attached to the plate 108. A small tension spring 124 attached to the free end of the armature and to the plate 108 normally holds the armature away from the electro-magnets 116. Rigidly secured to the ends of the shaft 120 are a pair of arms 126 having projecting fingers 128 and attached to these fingers is a curved rod 130 preferably of insulating material. The shape of the rod 130 is the same as the potentiometer 112 and as will be observed with reference to Figure 1 the rod 130 is positioned throughout its length directly in front of the potentiometer.

The particular construction of the pressure recorder 110 (Figure 12) does not form a part of the invention and it is of any suitable type containing means for energizing the electro-magnets 116 at predetermined intervals. As will be seen from the foregoing description, when the magnets 116 are energized, the armature 118 and the arms 126 will be moved in a clockwise direction, as shown in Figure 5, toward the magnets, and the rod 130 attached to the fingers 128 will engage the pointer contact 114 forcing the latter into engagement and electrical contact with the potentiometer 112. The potentiometer 112 and the pointer 66 are connected in circuit with the pressure recorder 110, the arrangement being such that each time the contact is made between the pointer 66 and the potentiometer 112, the instrument 110 will record the position of the pointer with respect to the scale 68 and thus the pressure being exerted at that particular instant on the grease in the container 40.

*Driving mechanism*

In order to force the plunger 42 into and through the grease contained in the cup 40, an electric motor 134 is mounted in the lower portion of the casing 10 and may be connected to the plunger 42 through the mechanism which will now be described.

As will be observed with reference to Figure 3, the plunger plate 42 is attached to a rod 136 which is rigidly secured to and suspended from a yoke 138. The ends of the yoke 138 are suitably attached to a pair of pull rods 140 which extend downwardly within the casing 10 and are similarly attached at their lower ends to another yoke 142 which is secured at its midpoint to the upper end of a vertically disposed screw 144. The bottom or lower wall 146 of the upper casing 16 is provided with a pair of upwardly projecting bearing guides 148 having flanged lower ends 150 for engagement with the heat insulated wall 146. The guides are secured in position by means of a pair of threaded nuts 152 and a suitable washer 154.

The bracket 52 which supports one end of the scale beam 50 is generally tubular in shape and is provided along its sides with a pair of longitudinal slots 156. As is shown in Figure 4, the tubular bracket 52 normally encloses the upper end of the screw 144 and the slots 156 serve to guide the yoke 142 in its vertical movement. An internally threaded sleeve 158 has its upper end journaled in a hub 160 depending from the partition 14 and its lower end journaled in a bracket 162 also attached to the partition 14. A threaded wheel 164 is rigidly secured to the sleeve 158 by means of suitable set screws between the bracket members 160 and 162, and between the hub of the wheel 164 and the bracket 160 is an anti-friction thrust bearing 166 of the usual ball bearing type. It will be seen that the sleeve 158 is prevented from longitudinal movement and the rotation of this sleeve will, therefore, cause the screw 144 threaded therein to move up or down depending upon the direction of rotation. The lower end of the sleeve 158 is provided with a knurled disc 168 so that the sleeve may be turned manually to move the screw 144 and thus the plunger 42 up or down.

For rotating the wheel 164 a cooperating worm 170 is provided and, as is shown in Figure 7, the worm is mounted upon a shaft 172 journaled in an eccentric sleeve 174, which sleeve is rotatably mounted in a bracket 176 depending from the partition 14. An arm 178 is attached to the eccentric sleeve 174 and serves as a means for rotating the sleeve. The end of the worm shaft 172 opposite the worm 170 has secured thereon a gear 180, this gear normally meshing with a smaller driving gear 182. It will be seen that when the arm 178 is moved angularly the eccentric sleeve 174 will be turned and the worm 170 will be disengaged from the wheel 164 and at the same time the driven gear 180 will be separated from the driving gear 182. As shown in Figures 7 and 9 the eccentric 174 is provided with an encircling groove 184 adapted to be engaged by a small pointed plunger 186 forced against the eccentric by a compression spring 188.

When it is desired to withdraw the plunger 42 upwardly from the grease container 40 the worm 170 is disengaged from the wheel 164 in the manner set forth and the knurled disc 168 may then be turned by hand in a direction to raise the screw 144 and consequently the plunger 42. The spring pressed plunger 186 serves to hold the eccentric 174 in any position in which it may be turned by the term 178.

The gear 182 is secured to a shaft 190, the ends of which are journaled in bearings provided in a pair of brackets 192 secured to and depending from the partition 14. Adjacent the gear 182 and secured to the shaft 190 is a larger gear 194 and on the opposite side of the left hand bracket 192 and also secured to the shaft 190 is a smaller gear 196. The shaft 190 is threaded throughout substantially all of its length between the brackets 192 for a purpose which will be described hereinafter.

The shaft 198 of the driving motor 134 is connected by means of a coupling 200 and a suitable reduction gear box 202 to one side of a clutch 204. The outer or left hand end of the motor shaft 198 is journaled in a bracket bearing 206 and affixed to the shaft at a point adjacent the bracket 206 is one side of a second clutch 208. Slidably mounted on the motor shaft 198 is a short tubular shaft 210 and secured to one end of this shaft is the other half of the clutch 204. Affixed to the other end of the shaft 210 is the other half 212 of the second clutch. Also secured to the shaft 210 are a pair of gears 214 and 216. A clutch lever 218 pivotally mounted at its lower end on the wall 12 of the casing 10 is provided with a pin 220 adapted to engage in a groove, not shown, in the clutch member 212. A pin 221 cooperating with a pair of holes in a bracket 223 is adapted to hold the lever 218 in either of its extreme positions. In the view shown in Figure 1 the lever 218 is in its left hand position with the clutch members 208 and 212 engaged and the small gear 214 meshing with the larger gear 194. The motor 134 will thus rotate the gear 194 and through the gearing shown in Figure 10 the shaft 172 will also rotate, thus driving the worm 170 and worm wheel 164. As has been explained hereinbefore the rotation of the worm wheel 164 will cause the perforated plunger 42 to be lowered into and through the grease contained in the cup 40.

*Mechanism for maintaining a constant pressure on the grease being tested*

In case it is desired to run a "constant pressure" test the mechanism now to be described will be utilized. As will be observed with reference more particularly to Figures 7 and 8, a rod 222 is mounted between and has its ends secured in the brackets 192, the rod 222 forming a support for a slider shown in Figure 8. Also supported by and mounted between the brackets 192 is a potentiometer 224, this device preferably comprising a winding of bare electrical resistance wire on a rod 226 and being similar, electrically, to the potentiometer 112 described previously. The potentiometer resistance is, of course, suitably insulated from the rod 226, providing the latter is metallic, and the ends of the winding are secured in place by means of suitable clamps 228.

The slider shown generally at 230 in Figure 8 consists of an insulated block 232 having mounted transversely therethrough a short tube 234. The tube 234 fits closely upon and is adapted to slide along the supporting rod 222. The insulating block 232 has attached thereto a pair of spring arms 236 and 238, the outer or free end of the arm 236 having attached thereto a split nut 240, this member being threaded at 242 to engage the aforementioned threads on the shaft 190. The free end of the spring arm 238 has attached thereto an enlargement 244 adapted to press against and form electrical contact with the potentiometer winding 224.

From the foregoing description it will be seen that as the shaft 190 revolves, the split nut 240 and consequently the entire slider 230 will move along the guide rod 222 and an electrical contact will be made between the spring arm 238 and the potentiometer 224 in all positions. The split nut 240 is preferably provided with an extension arm 246 which may be raised by hand and held by a hook 248 attached to the partition 14. Thus the split nut 240 may be disconnected from the revolving shaft 190 when a "constant pressure" test is not being conducted.

*General features*

In the operation of the grease testing machine it is of course essential, as has been pointed out hereinbefore, that the walls of the heating chamber 20 be well insulated so that the temperature therein may be controlled accurately. It is also essential that the temperature within the casing 10 be maintained fairly constant and in order that heat from the chamber 20 may be prevented from entering the casing 10 through the upper wall thereof, the casing 16 is separated from the casing 10 by means of an air chamber 250. The casing surrounding the air chamber 250 is provided with a plurality of openings 252 and a plurality of vent pipes 254 leading downwardly from the chamber 250 lead to a duct 256 opening into a fan chamber 258 attached to the upper wall of the casing 10. An electric motor 260 suspended from the casing 258 serves to drive an exhaust fan, not shown, within the chamber 258. The motor 260 in driving the exhaust fan draws air at atmospheric temperature into the chamber 250 through the openings 252 and into the fan chamber 258 through the pipes 254 and the duct 256. The air is then blown out of the chamber 258 through an opening 262 in the back wall of the casing 10. Thus, by constantly drawing air at room temperature into the chamber 250 the possibility that heat may pass downwardly from the chamber 20 into the casing 10 is rendered substantially negligible.

*Electrical connections and operation*

With reference to the wiring diagram comprising Figure 12 of the drawings, first, a 110 volt alternating current circuit having its source at 272 and, second, a 10 volt direct current circuit having its source at 274. The 110 volt A. C. circuit includes, of course, the plunger driving motor 134, the oven fan motor 34, the ventilating fan motor 260 and the heating unit 38 in the oven chamber, while the 10 volt D. C. circuit includes the control equipment such as certain relays and other contact devices to be explained.

The enclosure designated by the dotted line indicates the heating or oven chamber 20 and within this chamber will be observed the fan of the motor 34, the heating element 38, a pair of small electric lamps 276 and 277, as well as the grease container or test cup 40 and its associated plunger 42. The driving connection for the plunger 42 is indicated diagrammatically by the rod 140. The oven fan motor 34 is shown as connected through the multi-point plug switch 278, the switch S₆ and a circuit breaker 280 to the 110 volt A. C. line. The lamps 276 and 277 which are used for lighting the interior of the chamber 20 so that the grease may be viewed through the tube 47 (Figure 1), are connected to the source 274 through the multi-point plug switch 278, switches S₇ and S₈, and the circuit breaker 289 which is also connected in the 10 volt D. C. circuit. The ventilating fan motor 260 is connected in the 110 A. C. circuit through the switch S₂ and the circuit breaker 280. The plunger driving motor 134 and a motor 282 which serves to drive the pressure recorder 110 and the temperature regulator 284 are connected in the 110 volt A. C. circuit through the switch S₁ and the circuit breaker 280, the plunger driving motor 134 also having in its circuit the relay switch 286, the operation of which will be explained hereinafter.

Connected to the temperature regulator 284 is a thermocouple 288 located within the oven chamber 20. The temperature regulator 284 is also connected through the multipoint plug switch 290 to the energizing coil of a relay 292 which relay is connected to the heating element 38 in the oven chamber 20. The purpose of the multi-point plug switches 278 and 290 is to make it easier to assemble and disassemble the apparatus. Switch 278 is placed in the connections to the heating or oven chamber 20 and the switch 290 is located in the connections to the temperature regulator 284 and the pressure or rate of entry recorder 110. It is understood, of course, that one half of each of these switches is provided with prongs which fit within correspondingly spaced openings or sockets in the other half, and the switches are disconnected merely by pulling the two halves apart. The temperature regulator is usually provided with a manually operable dial and the arrangement is such that by proper adjustment of the dial this instrument, which is responsive through the thermocouple 288 to the temperature existing in the oven chamber 20, will control the energization of the heating element 38 so as either to maintain the temperature in the oven at a predetermined fixed point or to increase or decrease the temperature therein at a predetermined uniform rate.

A temperature recorder 294 has connected thereto a thermocouple 296 responsive to the temperature in the oven chamber 20; a thermocouple 298 attached to the grease container 40 so as to be responsive to the temperature of the grease therein and a thermocouple 300 which is located outside of the machine so as to indicate the temperature of the room in which the machine is being operated. The pressure recorder 110, the temperature regulator 284 and the temperature recorder 294 are all instruments which may be purchased in the market and their construction, therefore, forms no part of this invention. The pressure recorder 110 and the temperature recorder 294 are of the type in which a paper chart is caused to move past a suitable pen or other marking device at a predetermined uniform speed. The charts showing the amount of pressure exerted between the plunger 42 and the grease in the cup 40 and the amount or rate of entry of the plunger into the grease cup are made directly on the pressure or rate of entry recorder 110 while the temperatures indicated by the thermocouples 296, 298 and 300 are plotted on a chart by the temperature recorder 294. A storage battery or dry cells 301 are connected to the pressure or rate of entry recorder 110 and serve as a current supply for the circuits including the magnets 116 and the potentiometers 112 and 224.

A plurality of electrical contact devices are mounted in the testing machine and are connected to a circuit breaker 280. One of these contact devices 302 is shown in Figure 12 as being mounted adjacent the upper end of the potentiometer 112 in a manner such that in the event that the pressure exerted by the plunger 42 on the grease in the cup 40 should become so great that the pointer 66 of the scale mechanism should tend to move past the end of the potentiometer 112, the pointer will engage and close the contacts. Another contact device 304 is mounted near the end of the potentiometer 224 for a like purpose, i. e., so that in case the slider 230 should move to the extreme left hand end of the potentiometer the contact will be closed. Still another similar contact device 306 is shown diagrammatically as mounted in a position to be actuated by the plunger driving mechanism 140 when the plunger has reached the bottom of the cup 40. The contact devices 302, 304 and 306 are connected in circuit with the magnet coil 308 of the circuit breaker 280 and should any one of these contact devices be actuated to close as described the circuit breaker 280 will open, thus stopping the plunger driving motor 134 and all of the other electrically driven apparatus.

A plurality of two-way single-throw switches S₉, S₁₀ and S₁₁ are connected in the circuits of the two potentiometers 112 and 224. If these three switches are thrown to their upper position as viewed in Figure 12, the potentiometer 112 will be in circuit with the pressure recorder 110 and these conditions will obtain whenever a "constant rate of entry" test is being run, that is, when it is desired to record the pressures exerted between the plunger 42 and the grease in the cup 40 when the plunger is being moved uniformly into the cup. When the switches S₉, S₁₀ and S₁₁ are moved to their lower position the potentiometer 224 will be connected in circuit with the pressure or "rate of entry" recorder 110, in place of the potentiometer 112, and with these connections the instrument 110 will record the amount or "rate of entry" of the plunger 42 into the grease test cup 40 when a constant predetermined pressure is being maintained between the plunger and the cup.

Let it be assumed that it is desired to run a "constant rate of entry" test or, in other words, that it is desired to determine the pressures exerted by the plunger 42 on the grease in the cup 40 while the plunger is being forced into and through the grease at a uniform rate and while at the same time the temperature within the oven chamber 20 is raised uniformly at a rate of say 1° Fahrenheit per minute. A sample of grease is cut directly from the cake that is to be tested, using the cup or container 40 to do the cutting in order that the grease to be tested may not be disturbed and to avoid any extra working of the grease. The container and grease sample are then placed on the plate 44, this plate being connected, as has been explained hereinbefore, to the sensitive scale mechanism. The temperature within the oven chamber 20 is brought up to some predetermined point, for instance, 100° Fahrenheit, by means of the temperature regulator 284, and the regulator is adjusted so that the temperature within the over chamber will be increased at a rate of 1° Fahrenheit per minute.

The worm 170 is disconnected from the worm wheel 164 by turning the arm 178 and thus the eccentric 174 and the knurled disc 168 is turned in a direction such that the plunger plate 42 will be lowered into the grease in the cup 40 until the grease begins to feed through perforations in the plunger. The eccentric 174 is then turned so as to again bring the worm 170 and the worm wheel 164 into engagement. The switches S₁, S₂, S₃, S₅, S₆, S₇ and S₈ are closed and the switches S₉, S₁₀, and S₁₁ are moved to the upper position as viewed in Figure 15. Clutch shift lever 218 will be moved and locked in its left hand position by means of the pin 221 and the motor 134 driving through its shaft 198, the clutch members 208 and 212, the gears 214, 194, 182 and 180 will rotate the worm 170 and worm wheel 164. The rotation of the sleeve 158 will cause the screw 144 to move downwardly and thus the plunger plate 42 will be lowered into the cup 40 at a constant rate, usually a few thousandths of an inch per hour.

The force caused by the resistance of the grease to the plunger 42 will be transmitted from the platform plate 44 to the scale beam 50 and thus to the pointer 66 by means of the flexible strip 56. The pointer 66 will thus be deflected and the position of the pointer with respect to the scale 68 will indicate the amount of the force exerted by the plunger in pentrating the grease. Naturally the higher the force necessary for the plunger to pass through the grease sample, the greater will be the deflection of the indicator pointer 66. During this time the pressure recorder 110 will cause the magnets 116 to be energized periodically, preferably every few seconds, and each time the magnets are energized the pointer 66 will be pulled laterally into contact with the potentiometer coil 112 by means of the arms 126 and rod 130 shown in Figure 5. As will be observed from an inspection of the electrical diagram comprising Figure 12, the pointer 66 is also connected in the circuit of the pressure recorder 110 and thus each time the pointer contact 114 engages the potentiometer 112 the pressure recorder 110 will cause a mark to be made on the customary moving chart referred to hereinbefore. A continuous record will thus be made of the varying pressures indicated by the scale mechanism 50—66.

During the above described operation the arm 84 will have been moved upwardly and out of the range of the pointer 66. Should for any reason the pointer 66 tend to move upwardly beyond the potentiometer coil 112 or should the plunger reach the bottom of the test cup 40 the contact devices 302 or 306 respectively will be closed, thus opening the circuit breaker 280 and stopping the plunger driving motor. During all of the operation so far described the fan motor 260 will draw air into the chamber 250 and exhaust the same from the casing 10 through the opening 262 in order to prevent the transfer of heat from the oven chamber 20 to the interior of the larger casing where such heat might affect the instruments to cause them to register improperly. Even temperature distribution within the over chamber 20 is maintained by the fan driven by the motor 34.

Let us now assume that it is desired to run a "constant pressure-increasing temperature" test. The sample of grease is cut and placed on the platform plate 44 in the same manner as for the "constant rate of entry" test already described. The plunger 42 is then lowered by hand until the pointer 66 registers a desired pressure of, for instance, 25 lbs. The arm 84 will then be adjusted by means of the knurled nut 98 and brought into substantial alignment with the pointer 66 when the latter is indicating the predetermined pressure, i. e., 25 lbs. The position of the arm 84 will be such that when the pointer 66 indicates a 25 lb. pressure the pin 106 on the pointer will engage the contact strip 100 secured to the end of the arm 84 holding the strip away from the contact pin 104 thus breaking the circuit to the plunger driving motor 134 as will be observed with reference to Figure 12. For this test, switch S₃ will be opened while S₁, S₂, S₄, S₅, S₆, S₇ and S₈ will be closed and the switches S₉, S₁₀ and S₁₁ will be moved to their lower positions so as to connect the potentiometer 224 into the circuit of the recording instrument 110 in place of the potentiometer 112.

With the connections described in the preceding paragraph the plunger driving motor 134 will not operate and, consequently, there will be no further movement of the plunger 42 into the grease in the cup 40. The clutch shift lever 218 will be moved and locked in its right hand position with the clutch 204 connected and with the clutch members 208 and 212 disconnected. In this position the gear 216 will mesh with the gear 196. As was the case in the previously described test, the temperature regulator 284 will be adjusted to increase the temperature in the oven chamber 20 at a uniform rate of 1° Fahrenheit per minute. The slider arm 246 will be disengaged from the hook 248 and the split nut 240 allowed to mesh with the shaft 190, and therefore any rotation of the shaft 190 will cause a movement of the slider contact 244 along the potentiometer 224. The pressure between the plunger 42 and the grease in the cup 40 will remain constant until the temperature has been increased sufficiently for some of the grease to feed through the perforations in the plunger and as soon as this happens the pressure will drop and the pointer 66 will move downwardly to indicate a lower pressure. When this occurs the pin 106 will move away from the contact strip 100 allowing an electrical contact to be made between that strip and the pin 104.

As will be observed with reference to Figure 12, when a contact is made between the elements 100 and 104 the relay 286 will be actuated and the plunger driving motor 134 will be connected in the 110 volt A. C. circuit. The motor 134 acting through the clutch 204 and the gears 216 and 196 will cause the screw 144 to lower the plunger 42 into the grease, thus again increasing the pressure. As soon as the pressure has been brought up to the desired amount, i. e., 25 lbs., the pin 106 on the pointer 66 will again open the electrical circuit between the contact elements 100 and 104 thus causing the relay 286 to disconnect the plunger driving motor 134 from the circuit. The pressure will, in all probability, remain at this amount until a time when the temperature within the oven chamber 20 has again increased sufficiently to cause more of the grease to pass through the perforations in the plunger 42. At this point the pressure will again drop and the motor 134 will be again connected in the circuit so as to once more bring the pressure back to the predetermined amount. These periods when the motor 134 operates to lower the plunger will become increasingly more frequent until a point is reached when the grease will flow freely through the perforations in the plunger after which the test will be stopped. Should the slider 230 be moved toward the left so far as to reach the end of the potentiometer 224 the contact device 304 shown in Figure 15 will be actuated to open the circuit and thus stop the driving motor 134 as has been previously described.

The "constant temperature-maximum initial pressure" test is run in a manner quite similar to the "constant pressure-increasing temperature" test but with the temperature within the oven chamber 20 maintained at a predetermined point by means of suitable adjustment of the temperature regulator 284. The motor 134 remains inoperative throughout the duration of the test and the potentiometer 112 is again connected in the circuit of the pressure recorder 110 by moving the switches $S_9$, $S_{10}$ and $S_{11}$ to their upper positions. The switches $S_1$, $S_2$, $S_3$, $S_5$, $S_6$, $S_7$ and $S_8$ will be closed while the switch $S_4$ may remain open. The plunger 42 will be lowered manually into the grease in the cup 40 until a predetermined maximum pressure is indicated by the pointer 66, the arm 84 being adjusted so that the pin 106 on the pointer will engage the spring 100 to maintain open the contact at 104 (Figure 12). The grease is allowed to feed through the plunger plate 42 while the temperature in the oven chamber remains constant as has been already stated.

Obviously, many modifications and variations of the invention, as hereinbefore set forth, may be made without departing from the spirit and scope thereof, and therefore only such limitations should be imposed as are indicated in the appended claims.

I claim:

1. In a device for continuously indicating the position of a pointer over a scale and intermittently closing an electric circuit, a graduated scale, a pointer adapted to register with said scale, an electrical potentiometer mounted in proximity to and extending lengthwise along said scale and connected in said electric circuit, electromagnetic means for intermittently moving said pointer towards said scale and into electrical contact with said potentiometer so as to close said electrical circuit, said last mentioned means comprising an electromagnet, an armature for said magnet, a rod of electrically insulating material secured to said armature and disposed in alignment with said potentiometer, and means for intermittently energizing said electromagnet, the arrangement being such that when said magnet is energized the rod will be moved toward said scale, thus forcing the pointer into contact with the potentiometer.

2. In a device for continuously indicating the position of a pointer over a scale and intermittently closing an electric circuit, an electrical potentiometer mounted in proximity to and extending lengthwise along said scale, a normally open electrical circuit including said potentiometer, means for intermittently moving said pointer into electrical contact with said potentiometer comprising an electromagnet, an armature for said magnet, a member of electrical insulating material secured to said armature and having substantially the same shape as the path of the free end of said pointer, said member being disposed parallel to and at the side of the pointer away from said potentiometer and means for energizing said magnet so that said member will engage the pointer and force the end of the pointer into contact with the potentiometer to close said electrical circuit.

3. In a device for continuously indicating the position of a pointer over a scale and intermittently closing an electric circuit, electrical resistance means mounted in parallel and in close proximity to the path of the end of said pointer, means for periodically moving said pointer laterally into contact with said resistance means to vary said electrical resistance comprising an electromagnet, an armature for said magnet, a rod-like member of electrical insulating material secured to said armature and disposed so as to be parallel to said resistance member, the end of the pointer being adapted to move freely between said rod member and said resistance member, and means for energizing said magnet so as to cause said rod member to force the end of the pointer into contact with said resistance member.

PAUL McJUNKIN.